US006442239B1

United States Patent
Abdo et al.

(10) Patent No.: US 6,442,239 B1
(45) Date of Patent: Aug. 27, 2002

(54) TELEPHONE LINE LONGITUDINAL BALANCE TESTER AND METHOD

(75) Inventors: James A. Abdo; George Alter; Lawrence O. Hilligoss, all of Ashland, OR (US)

(73) Assignee: Communications Manufacturing Company, Los Angeles, CA (US)

( * ) Notice: Subject to any disclaimer, the term of this patent is extended or adjusted under 35 U.S.C. 154(b) by 0 days.

(21) Appl. No.: 09/360,223

(22) Filed: Jul. 23, 1999

(51) Int. Cl.[7] .......................... H04M 1/24; H04M 3/08; H04M 3/22

(52) U.S. Cl. .................. 379/26.01; 379/22; 379/22.02; 379/22.03; 379/32.02

(58) Field of Search .............................. 379/1.04, 14.01, 379/15.03, 22, 22.01, 22.02, 22.03, 22.04, 22.07, 22.08, 25, 27.01

(56) References Cited

U.S. PATENT DOCUMENTS

| | | | |
|---|---|---|---|
| 3,636,439 A | * 1/1972 | Colligan | |
| 3,781,665 A | * 12/1973 | Gale | |
| 4,278,931 A | 7/1981 | Huggins | 324/52 |
| 5,157,336 A | 10/1992 | Crick | 324/613 |
| 5,302,905 A | 4/1994 | Crick | 324/613 |
| 5,436,953 A | 7/1995 | Nilson | 379/27 |
| 6,052,420 A | * 4/2000 | Yeap et al. | |
| 6,144,721 A | * 11/2000 | Stephens | |

OTHER PUBLICATIONS

Publication entitled "CMC® 8336H PairChek,"3 pp. (believed to be published or in public use or on sale prior to Jul. 1998).

Publication entitled "SIDEKICK™ 7B—Beat Repeats, " Tempo Research, Vista, Calif., 2 pp. (believed to be published or in public use or on sale prior to Jul. 1998).

Publication entitled "Model T207—Longitudinal Balance Test Set, " Wilcom Products, Inc., Laconia, N.H., 4 pp. (believed to be published or in public use or on sale prior to Jul. 1998).

Publication entitled "Instruction Manual—Model T207—Longitudinal Balance Test Set," Wilcom Products, Inc., Laconia, N.H., 26 pp. (Nov. 1977).

Publication entitled "Model T279—Circuit Termination Set," Wilcom Products, Inc., Laconia, N.H., 2 pp. (believed to be published or in public use or on sale prior to Jul. 1998).

Publication entitled "T–279—Instruction Manual," Wilcom Products, Inc., Laconia, N.H., 21 pp. (May 1990).

Schematic drawing entitled "T301—Tone Sender, " Wilcom Products, Inc., Laconia, N.H., 1 p. (believed to be published or in public use or on sale prior to Jul. 1998).

(List continued on next page.)

*Primary Examiner*—Duc Nguyen
(74) *Attorney, Agent, or Firm*—McAfee & Taft

(57) ABSTRACT

A longitudinal balance test circuit connects to the tip and ring lines of a pair of telephone wires. It also connects to a shield conductor that extends with the tip and ring lines. The test circuit includes a transformer which has two windings. One winding connects to the tip and ring lines, and it also connects to the shield conductor. The other winding connects to a signal generator that provides an alternating current test voltage with which to test longitudinal balance of the tip and ring lines. A method of testing a telephone line for longitudinal balance comprises: measuring an alternating current test signal applied to a telephone line under test; measuring stressed noise of the telephone line in response to the applied. alternating current test signal; calculating, in response to the measured alternating current test signal and the measured stressed noise, an adjusted value related to longitudinal balance regardless of the length of the telephone line under test; and displaying the adjusted value.

20 Claims, 5 Drawing Sheets

OTHER PUBLICATIONS

Publication entitled "An American National Standard—IEEE Standard Test Procedure for Measuring Longitudinal Balance of Telephone Equipment Operating in the Voice Band (ANSI/IEEE Std 455–1985)," The Institute of Electrical and Electronics Engineers, New York, N.Y., 22 pp. (Jul. 25, 1985).

Tokarz, "Chapter IV—Silence is Golden—Especially with Open Wire," *Solving Noise and Transmission Problems in Telephonic Loop Plant*, 1st Ed., Telephony™ Publishing Corp., Chicago, Ill., pp. 37–51 (Apr. 1983).

* cited by examiner

TELEPHONE LINE LONGITUDINAL BALANCE TESTER AND METHOD

BACKGROUND OF THE INVENTION

This invention relates generally to telephone test circuits and methods. In particular, it relates to a test circuit or device with which to test the longitudinal balance of a telephone line. The invention al,so relates to a method of testing a telephone line for longitudinal balance, wherein the testing accommodates changes in a test signal that occur when the test signal is applied to telephone lines having different lengths.

A telephone line with which the present invention can be used includes two wires, each of which is typically insulated and twisted with the other to define a twisted wire pair. Typically, several pairs are grouped in a cable that has a surrounding outer conductive shield that is connected to earth ground when put in use.

Such a cable can be used, for example, between a central office and a crossconnect box in a telephone system. Another such cable can extend from the crossconnect box into the user territory where individual pairs are routed to respective end users. In this example, one end of a particular pair connects to a residential crossconnect box and the other end connects to a conventional telephone set in a house. A corresponding pair in the other cable connects to the crossconnect box at one end and to the central office at the other end. Cross connections at the box connect the pair running to the house with the pair running to the central office.

Each such pair of wires preferably has certain characteristics that facilitate clear transmissions of voice or data signals. These are well known in the industry, and there are various test devices to check the characteristics. One of these characteristics is referred to as longitudinal balance.

Longitudinal balance relates to the difference in voltage between the two wires of a pair (i.e., the responsive "metallic voltage") that arises in response to a voltage that might arise between the wires and earth ground (i.e., the disturbing "longitudinal voltage"). An example of a longitudinal voltage source in the environment of the telephone system is the alternating current transmitted through a public utility's power transmission system that runs close to telephone lines of the telephone system.

The Institute of Electrical and Electronics Engineers, Inc. has published a standard for measuring longitudinal balance. It defines the degree of longitudinal balance as the ratio of the disturbing longitudinal voltage $V_s$ and the resulting metallic voltage $V_m$ of the network under test expressed in decibels, namely:

longitudinal balance=20 $\log_{10}|V_s/V_m|$ dB, where the voltages are of the same frequency.

An equivalent way of determining longitudinal balance is to have test equipment generate the disturbing longitudinal voltage $V_s$ and use the responsive metallic voltage stated in decibels, specifically dBrnC (i.e., decibels above reference noise, as measured with C-message weighting) which is referred to as "stressed noise." If this value is below a respective predetermined value, then there is a minimal level of noise arising from the disturbing longitudinal voltage and thus there is acceptable longitudinal balance. It is this approach that has been used in a test device, model no. 8336H, manufactured and sold by communications Manufacturing Company of Los Angeles, Calif. under the trademark "PAIRCHEK." This device displays the "stressed noise" value. If the value is equal to or less than the respective predetermined value, the telephone technician testing the line knows the line is acceptably balanced (i.e., if the stressed noise is below the maximum acceptable limit, then the longitudinal balance is above the minimum acceptable limit).

In such a known type of test device, there is a circuit that generates an alternating current test signal as the disturbing or driving longitudinal voltage that is applied to the telephone line under test. This voltage varies with differences in the lengths of the telephone lines tested. That is, for a given test unit that is to generate the same driving longitudinal voltage from test to test, the driving longitudinal voltage in fact changes in response to the length of the telephone line to which the unit is connected for testing. This in turn means that the maximum acceptable level of stressed noise must change if a constant minimum longitudinal balance level is to be maintained.

SUMMARY OF THE INVENTION

The present invention provides a novel and improved longitudinal balance test circuit and test method that enable a telephone technician to use a single test device to accurately test for longitudinal balance in telephone lines of different lengths despite the driving longitudinal voltage output by the test circuit changing due to different lengths of telephone lines tested.

In another aspect of the present invention, a novel and improved test circuit that can be used to perform the method of the present invention (or other methods for which it is suited) includes a coupling transformer to provide the generated driving voltage to the pair of wires of the telephone line under test. This longitudinal balance test circuit of the present invention comprises a transformer including a first winding that connects to a telephone line. This transformer also includes a second winding that connects to a voltage source providing an alternating current test voltage with which to test longitudinal balance of the telephone line. In a particular implementation, the first winding is adapted to connect at one end to tip and ring lines of the telephone line (specifically through matched impedances) and to connect at another end to a shield conductor of the telephone line.

Stated another way, the present invention provides a device to test a shielded telephone wire pair. The device comprises a first connector to connect to a first wire of the shielded telephone wire pair, a second connector to connect to a second wire of the shielded telephone wire pair, and a third connector to connect to the shield of the shielded telephone wire pair. The device further comprises an alternating current test signal generator and a transformer. The transformer includes: a first winding having one end connected to the first and second connectors and having another end connected to the third connector; and a second winding connected to the signal generator. The device still further includes an indicator connected to the first and second connectors.

The method, of testing a telephone line for longitudinal balance in accordance with the present invention comprises: measuring an alternating current test signal applied to a telephone line under test; measuring stressed noise of the telephone line in response to the applied alternating current test signal; calculating, in response to the measured alternating current test signal and the measured stressed noise, an adjusted value related to longitudinal balance regardless of the length of the telephone line under test; and displaying the adjusted value.

Another statement of the present invention is as a method of testing a telephone line for longitudinal balance comprising: connecting a test unit to the tip line, the ring line, and a shield of a selected telephone line to be tested; generating in the test unit an alternating current test signal and applying the test signal to the selected telephone line connected to the test unit; measuring in the test unit the alternating current test signal applied to the telephone line; measuring in the test unit stressed noise of the telephone line in response to the applied alternating current test signal; and calculating in the test unit, in response to the measured alternating current test signal and the measured stressed noise, an adjusted value to indicate whether the telephone line is or is not in balance regardless of the length of the telephone line under test.

Although not limiting broader aspects of the present invention, a particular aspect of the aforementioned calculating step is solving in a computer the equation $(x-(t-n))+y$, where x=a predetermined minimum acceptable longitudinal balance value (in dB), t=the measured value of the longitudinal test signal (in dBrnC), n=the measured value of stressed noise (in dBrnC), and y=a predetermined value representing a maximum acceptable stressed noise level (in dBrnC).

Therefore, from the foregoing, it is a general object of the present invention to provide a novel and improved longitudinal balance test circuit and method of testing a telephone line for longitudinal balance. Other and further objects, features and advantages of the present invention will be readily apparent to those skilled in the art when the following description of the preferred embodiments is read in conjunction with the accompanying drawings.

DETAILED DESCRIPTION OF THE INVENTION

Figure 1:
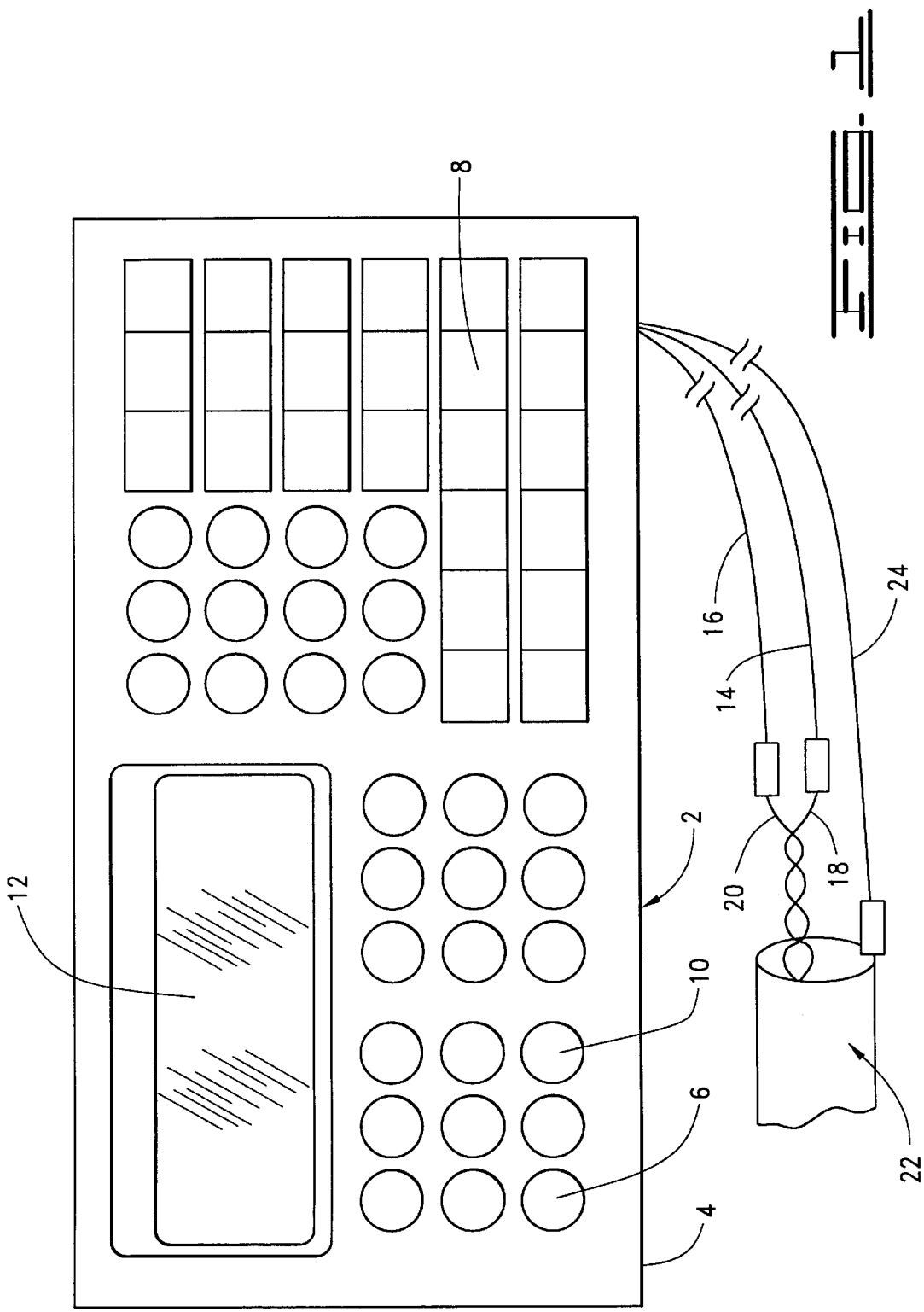
FIG. 1 is an external view of a device incorporating the longitudinal balance test circuit of the present invention.

A test device 2 for a telephone technician to use to perform a variety of tests on a telephone line is shown in FIG. 1. The device 2 is a battery operated, microprocessor based portable test unit contained in a housing 4. The user chooses a test to be performed using a membrane keyboard. For the present invention, the keys of significance are the "on off," "stress(ed) noise," and "fn" (function): keys 6, 8, 10, respectively. Their use is described below with reference to FIG. 5. Test results are displayed on a 4×20 character liquid crystal display 12. Display is in digital as well as analog bar graph formats.

Extending from the housing 4 are leads 14, 16 that connect to a pair of wires 18, 20 of a shielded telephone cable 22 when a test is conducted. The two wires, typically individually insulated and twisted together to define the pair, are designated "tip" and "ring" for a single telephone line as known in the art. Also extending from the housing 4 is a lead 24 that can be connected to earth ground, such as via connection to the outer conductive shield of the cable 22 shown in FIG. 1. Such connections are made as known in the art; for example, a telephone technician can make such connections using clips at the ends of the leads 14, 16, 24 to connect to the respective wires at a crossconnect box.

Although the particular device illustrated in FIG. 1 includes circuits to perform a number of functions useful in testing telephone lines; of interest to the present invention is the longitudinal balance function. This function is implemented by a longitudinal balance test circuit which will be described with reference to FIGS. 2 and 3.

Figure 2:
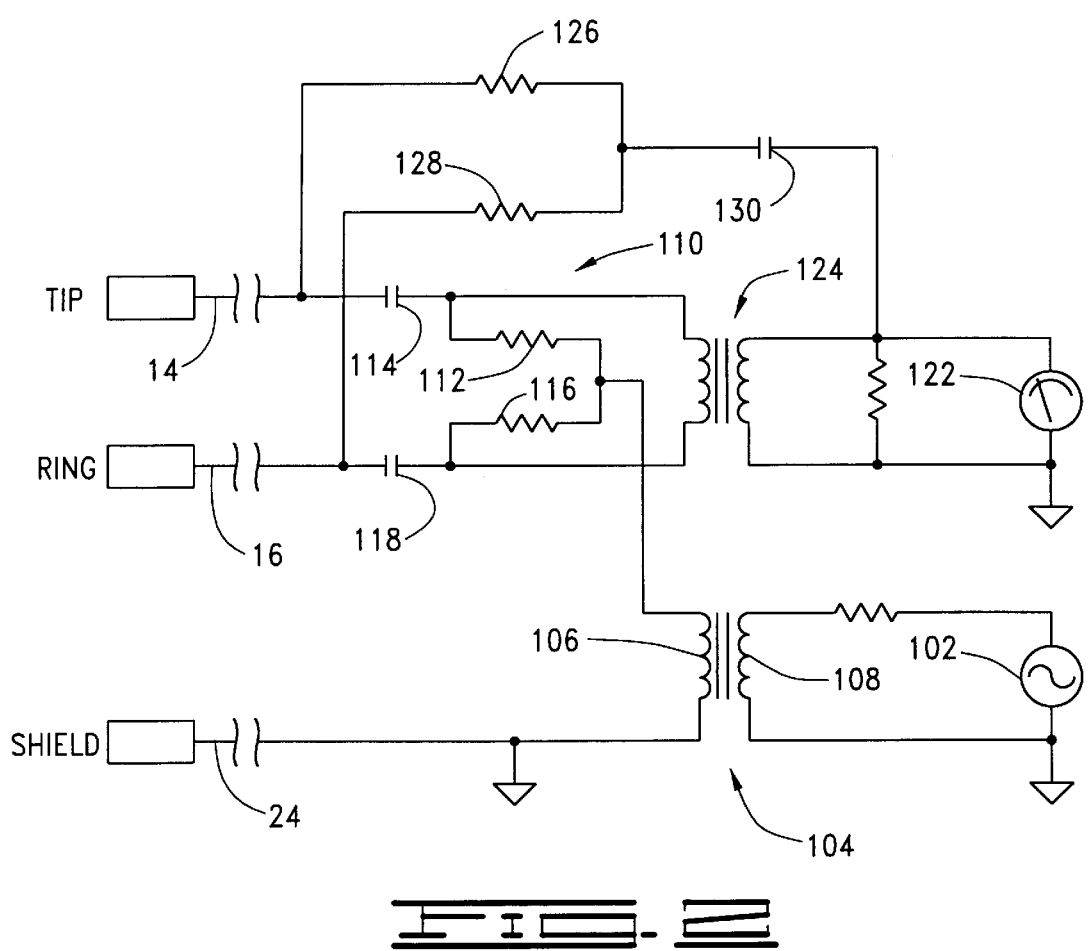
FIG. 2 is la simplified schematic circuit diagram of the preferred embodiment of the longitudinal balance test circuit of the present invention.

The longitudinal balance test circuit includes a transformer used in a test circuit to connect an alternating current test signal to tip and ring lines of a telephone line as schematically shown in FIG. 2. The alternating current test signal is provided by an alternating current test signal generator 102. One implementation of the generator 102 is as a conventional battery powered oscillator capable of providing a 1004 hertz signal at an output level such that the resulting longitudinal signal on the tip and ring conductors of a zero foot telephone line (i.e., an open circuit) is 100 dBrnC. The output level varies with cable length (the output level decreases as length increases). This variation in output has particular significance to another aspect of the present invention as will be described further below.

The transformer referred to above is transformer 104 shown in FIG. 2. The transformer 104 has a winding 106 that connects to the tip and ring lines as shown in FIG. 2. The transformer 104 includes a winding 108 that connects to the generator 102 providing the test signal with which to test longitudinal balance of the tip and ring lines. The windings 106, 108 are inductively coupled to each other such that there is electrical isolation between the windings but there is inductive coupling whereby the driving signal from the generator 102 induces the corresponding test signal in the winding 106.

A particular implementation of the transformer 104 is a 600 turns:345 turns Tamura TTC-30x series transformer with a flat frequency response in the voice band. Desirable features of this device include its small size, turns ratio, and flat frequency response in the:voice band.

One end of the winding 106 connects to the telephone tip and ring lines when the device 2 is used. As depicted in FIG. 2, this connection is via a balanced, direct current-blocking network 110. The network 1110 includes a resistor 112 and a capacitor 114 connected between the tip connector lead 14 and the winding 106. The network 110 also includes a resistor 116 and a capacitor 118 connected between the ring connector lead 16 and the winding 106.

Figure 3:
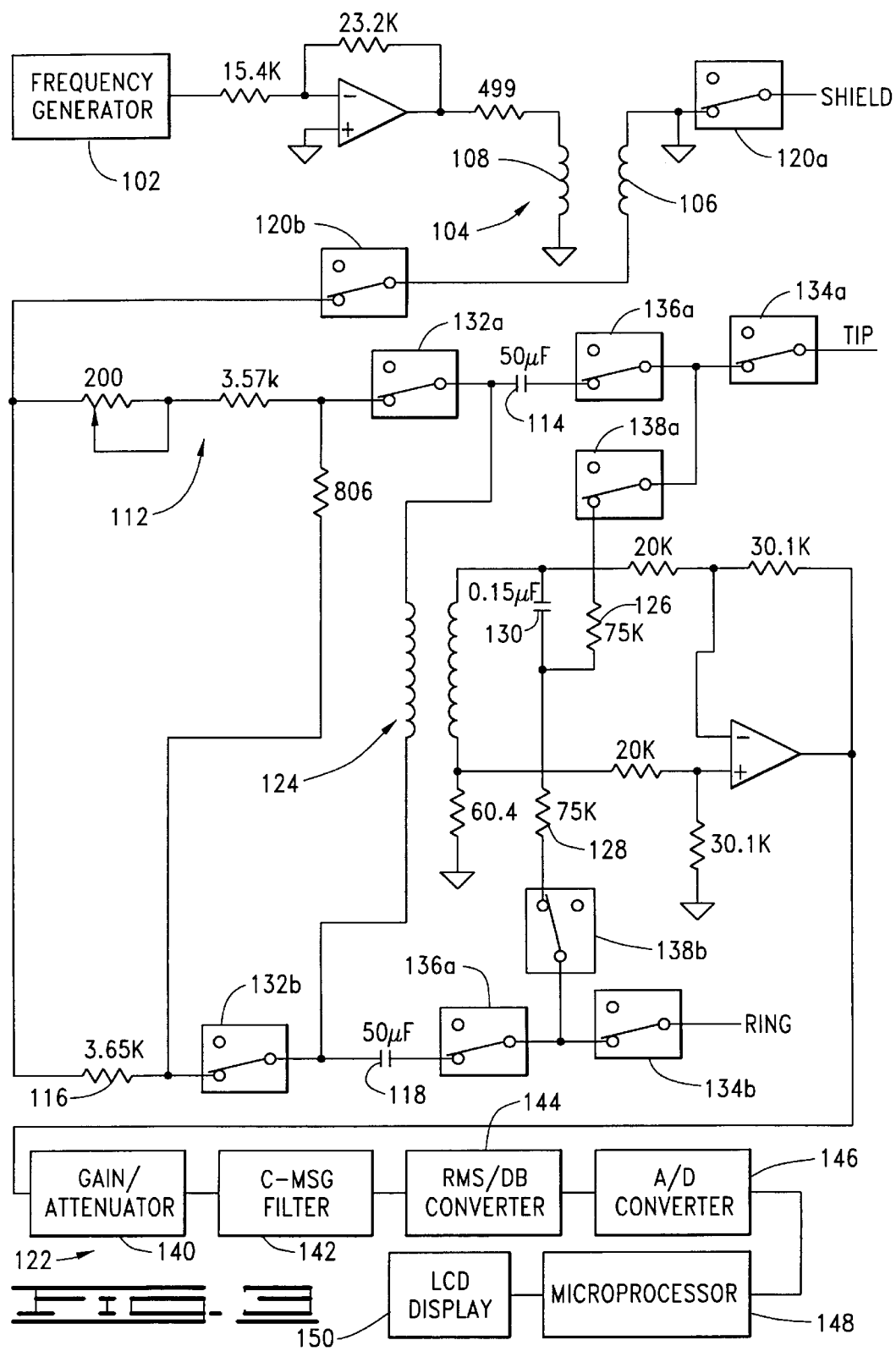
FIG. 3 is a detailed schematic circuit diagram of a particular implementation of the longitudinal test circuit of the present invention.

For the embodiment depicted in FIG. 2, the other end of the winding 106 is connected to ground reference and, via the lead 24, to the shield conductor of the cable 22 containing the tip and ring lines 18, 20. In the implementation of FIG. 3, the connection to the lead 24 is selectable as it is made through a switch 120a.

To display a reading related to longitudinal balance, the test circuit shown in FIG. 2 includes an indicator 122 connected to the connectors through which the test signal is connected to the tip and ring lines. In a particular implementation this indicator includes several components, mentioned below with reference to FIG. 3, that output al value in dBrnC. This output value can indicate longitudinal balance itself or it can indicate stressed noise as known in the art. In a particular implementation in accordance with another aspect of the present invention described further below, this output value can be adjusted to give a consistent reading for indicating balance or unbalance.

In the illustrated preferred embodiment, the indicator 122 is connected to a junction between the resistor 112 and the capacitor 114, and it is also connected to a junction between the resistor 116 and the capacitor 118. This connection is through a transformer 124 as known in the art. In the illustrated embodiment, the transformer 124 is a Midcom model 671-8240 transformer.

The display 122 is also used to display a reading of the longitudinal test signal itself. The test signal is provided to the display 122 through resistors 126, 128, connected between the conductors that are connectable to the tip and ring lines, and a capacitor 130, connected between the junction of the resistors 126, 128 and the ungrounded side of the transformer 124 output winding that connects to the indicator 122. This circuit is switchable in the following description of the particular implementation shown in FIG. 3.

In the implementation of the foregoing embodiment illustrated in FIG. 3, like aspects are designated with the same reference numerals. In addition, the FIG. 3 implementation includes switches 120 (including 120a mentioned above), 132, 134, 136, 138. Each of these switches has dual switch elements a, b that are simultaneously actuated (e.g., mechanically linked if mechanical switches or electrically operated at the same time if electronic switches). To measure and display the longitudinal test signal (the power influence), the switches are in the closed or on positions shown in FIG. 3. To measure and display stressed noise, the switches are as shown except for the switch 138, which is switched to its open or off position (the other position for the respective switch elements 138a, 138b from where they are shown in FIG. 3).

Also shown in FIG. 3 is a particular implementation of the display 122. This includes a gain/attenuator 140, a C-message filter 142, a rms-to-dB converter 144, an analog-to-digital converter 146, a microprocessor (and related memory, etc. defining a microcomputer,) 148, and the liquid crystal display 12. These components are as known in the art, such as in a previous product marketed under: the trademark "PAIRCHEK" (model no. 8336H) from Communications Manufacturing Company of Los Angeles, Calif.

The operation of the test circuits shown in FIGS. 2 and 3 is conventional (e.g., as in the aforementioned prior product marketed under the trademark "PAIRCHEK") except insofar as the use of the transformer 104 and the operation in accordance with the invention as further described below.

Figure 4:
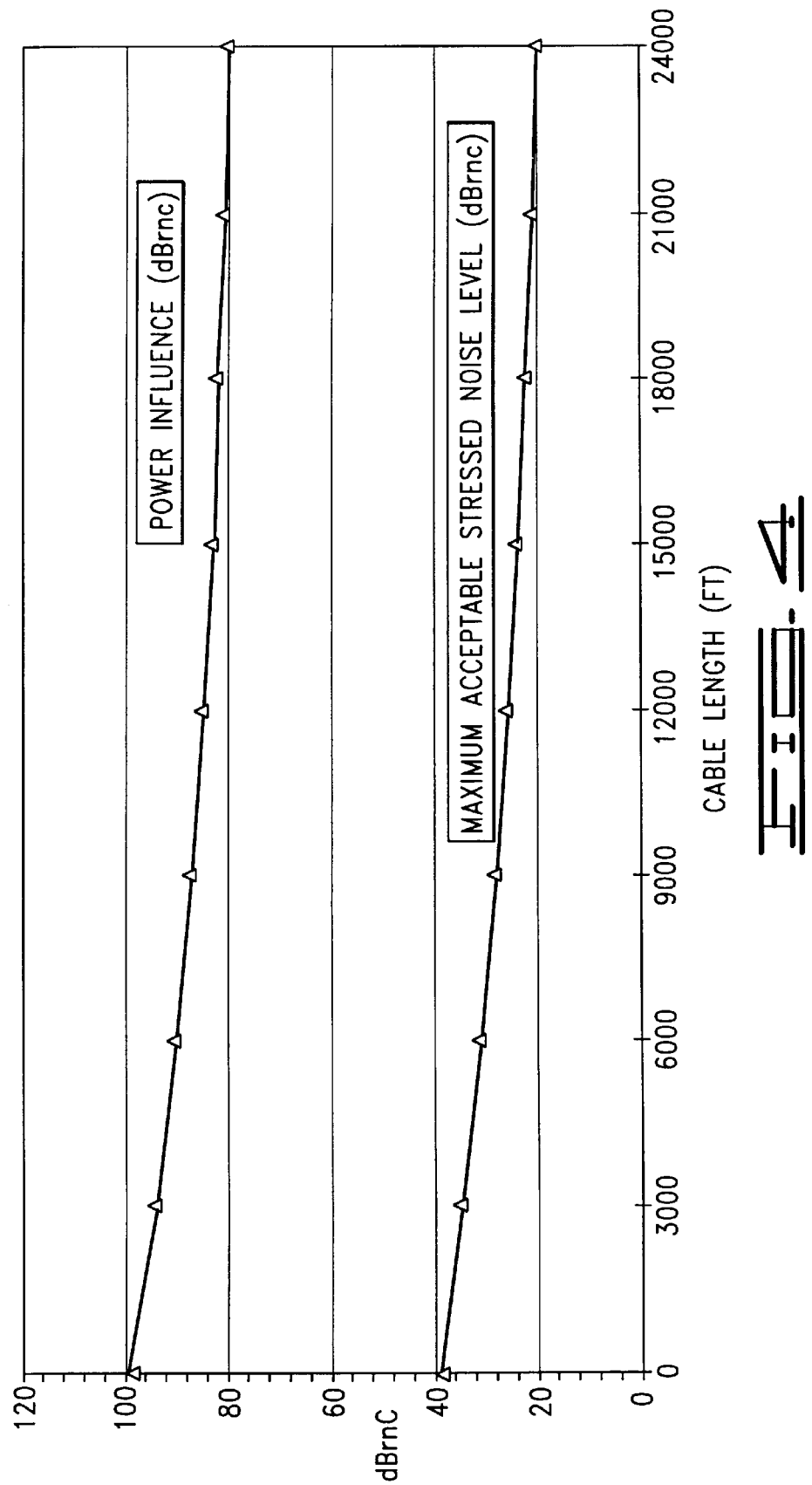
FIG. 4 is a graph showing changes in a driving longitudinal voltage test signal and a corresponding maximum acceptable stressed noise level.

The test circuits of FIGS. 2 and 3, or other suitable circuits, can bemused to perform the method of testing a telephone line for longitudinal balance in accordance with the present invention. This method comprises measuring an alternating current test signal applied to a telephone line under test. The test signal of the preferred embodiment is generated in the test unit by the oscillator 102 and the transformer 104. The alternating current test signal induced in the winding 106 of the transformer 104 is applied to the tip and ring lines of the selected telephone line connected to the test unit. In the illustrated embodiments, the voltage of this test signal varies with the length of the line to which the test circuit is connected. This is illustrated in FIG. 4 in which the applied test signal is labeled "power influence." This shows that the voltage of the illustrative test signal varies between about 100 dBrnC for no telephone line (i.e., the tip and ring connectors are open) and about 80 dBrnC for a telephone line 24,000 feet long. The test signal is measured (through operation of the display 122) by longitudinal coupling of tip and ring through the matching resistors 126, 128 and the capacitor 130 to the transformer 124. This voltage is measured as "power influence."

Because of the variation in the test signal in response to the length of the particular telephone line under test, the threshold defining what is or is not balanced varies. For a 60 dBrnC acceptance limit, which is the conventional value currently used in the industry, the varying limit line is shown in FIG. 4 and labeled "maximum acceptable stressed noise level." That is, this line is 60 dBrnC below the "power influence" line at each cable length. Thus, if stressed noise is greater than the "maximum acceptable stressed noise level," the line is not balanced. If the stressed noise is less than the limit, the line is balanced. However, as noted by the sloping "maximum acceptable stressed noise level" line in FIG. 4, what is acceptable stressed noise varies between about 40 dBrnC at zero length and about 20 dBrnC for a length of 24,000 feet.

To determine what the particular stressed noise is for a telephone line under test, the present invention measures stressed noise of the telephone line in response to the applied alternating current test signal. This occurs in a conventional manner in the preferred embodiment and it is obtained from the indicator 122. That is, switches 138a, 138b are opened and the resulting voltage (i.e., resulting from the applied test signal and nature of the tested line) appearing across the secondary winding of the transformer 124 is measured and displayed as unadjusted stressed noise.

Of course, to measure both the test signal and the resulting stressed noise, the apparatus being used is connected to the tip line and the ring line of the telephone line under test and to the cable shield, such as in the manner described above for the embodiments of FIGS. 2 and 3 and represented in FIG. 1.

Once the test signal measurement and the unadjusted stressed noise measurement have been obtained for a particular telephone line under test, the values of these measurements are used to calculate an adjusted value related to longitudinal balance regardless of the length of the telephone line under test. This adjusted value indicates, relative to a constant value, whether the telephone line is or is not in balance regardless of the length of the telephone line under test. Because the test signal and stressed noise values are in dBrnC in the preferred embodiment circuits described above, the preferred embodiment manner of calculating the adjusted value includes solving the following equation in a computer, such as the microprocessor based computer of the display 122:

$$\text{adjusted display value} = (x - (t - n)) + y$$

where $x$=a predetermined minimum acceptable longitudinal balance value (e.g., 60 dB for the aforementioned conventional definition of what is longitudinally balanced), $t$=the measured value of the test signal (in dBrnC), $n$=the measured value of unadjusted stressed noise (in dBrnC), and $y$=a predetermined value representing a maximum acceptable stressed noise level (e.g., 30 dBrnC). The adjusted display value is displayed through the indicator of the particular test device used.

Thus, regardless of the line length, the threshold between balance and unbalance is "y" (e.g., 30 dBrnC). By means of this adjustment, a telephone technician need only reference the displayed adjusted reading to "y" to know whether the tested line is balanced or not (i.e., above "y" the line is not balanced, below "y" the line is balanced); therefore, neither the test circuit nor the technician need know the actual line length to provide an accurate indication of longitudinal balance. One reason for referencing to 11 is that it is a widespread desired practice in the telephone industry to use a fixed value for qualification of a line; however, this is a problem when variations occur with different cable lengths. The method of the present invention allows use of a fixed reference for longitudinal balance testing regardless of cable length.

Figure 5:
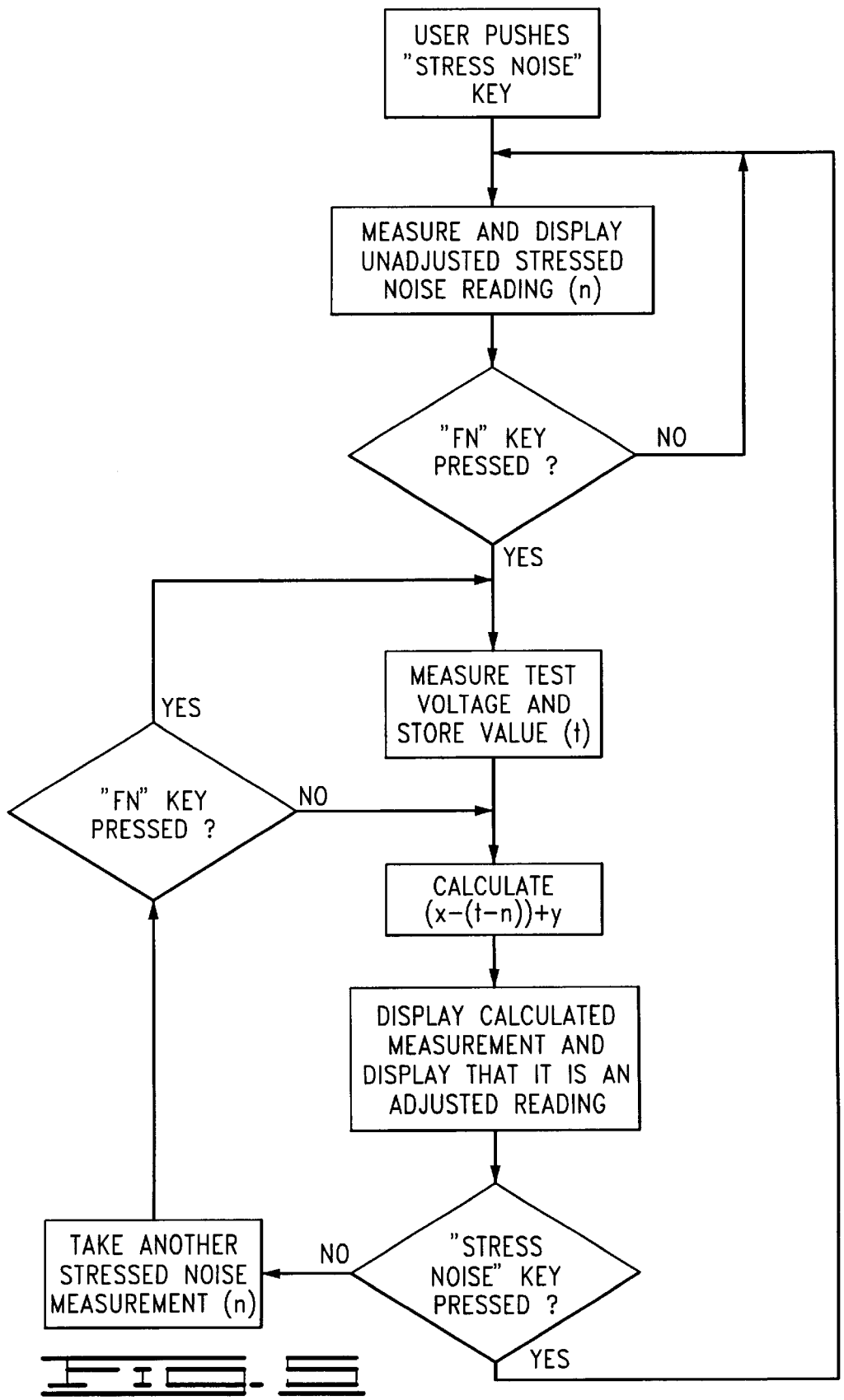
FIG. 5 is a flow chart for a program operating during a stressed noise Measurement operation of the present invention.

A flow chart of a program for the computer of the preferred embodiment test device 2 used in performing the method is shown in FIG. 5. When the user pushes the "stress noise" key 8 (after the test device has been connected via leads 14, 16, 24 such as represented in FIG. 1 and has been turned on using the "on off" key 6), the test device measures and displays the unadjusted stressed noise reading ("n" for the above equation); this occurs by placing or maintaining switches 120, 132, 134, 136 in their illustrated closed positions, opening or leaving open switch 138, and generating the test signal. If the "fn" key 10 is then pressed, the switch 138 is also activated to close so that both sections 138a, 138b are placed in their positions shown in FIG. 3. This yields the measurement for the power influence signal ("t" for the above equation). Since values "x" (e.g., 60 dB) and "y" (e.g., 30 dBrnC) are preset in the computer (either by original programming or subsequent programming), the computer then calculates the adjusted stressed noise value using the equation set forth above. This adjusted value is displayed through liquid crystal display 12 along with a notation that this is an adjusted reading. Thus, this reading can be interpreted by the user relative to a single reference "y" regardless of the cable length. The program then cycles on as indicated in FIG. 5.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A longitudinal balance test circuit, comprising a transformer including a first winding that connects to a telephone line, and a second winding that connects to a voltage source providing an alternating current test voltage with which to test longitudinal balance of the telephone line, wherein the first winding is adapted to connect at one end to tip and ring lines of the telephone line and to connect at another end to a shield conductor of the telephone line.

2. A longitudinal balance test circuit, comprising:
   a first connector to connect to a first wire of a telephone wire pair;
   a second connector to connect to a second wire of the telephone wire pair;
   a first winding connected to the first and second connectors;
   a second winding, inductively coupled to the first winding, to connect to a voltage source providing an alternating current test voltage;
   a third connector connected to the first winding to connect to a shield for the wire pair;
   a first resistor and a first capacitor connected between the first connector and the first winding; and
   a second resistor and a second capacitor connected between the second connector and the first winding.

3. A longitudinal balance test circuit as defined in claim 2, further comprising a longitudinal balance indicator connected between the first resistor and the first capacitor and connected between the second resistor and the second capacitor.

4. A longitudinal balance test circuit, comprising:
   a first connector to connect to a first wire of a telephone wire pair;
   a second connector to connect to a second wire of the telephone wire pair;
   a first winding connected to the first and second connectors;
   a second winding, inductively coupled to the first winding, to connect to a voltage source providing an alternating current test voltage;
   a first resistor and a first capacitor connected between the first connector and the first winding; and
   a second resistor and a second capacitor connected between the second connector and the first winding.

5. A longitudinal balance test circuit as defined in claim 4, further comprising a longitudinal balance indicator connected between the first resistor and the first capacitor and connected between the second resistor and the second capacitor.

6. A device to test a shielded telephone wire pair, comprising:
   a first connector to connect to a first wire of the shielded telephone wire pair;
   a second connector to connect to a second wire of the shielded telephone wire pair;
   a third connector to connect to the shield of the shielded telephone wire pair;
   an alternating current test signal generator;
   a transformer including:
      a first winding having one end connected to the first and second connectors and having another end connected to the third connector; and
      a second winding connected to the signal generator; and
   an indicator connected to the first and second connectors.

7. A device to test a shielded telephone wire pair, comprising:
   a first connector to connect to a first wire of the shielded telephone wire pair;
   a second connector to connect to a second wire of the shielded telephone wire pair;
   a third connector to connect to the shield of the shielded telephone wire pair;
   an alternating current test signal generator;
   a transformer including:
      a first winding having one end connected to the first and second connectors and having another end connected to the third connector; and
      a second winding connected to the signal generator;
   an indicator connected to the first and second connectors; and
   a balanced, direct current-blocking network connecting the one end of the first winding to the first and second connectors.

8. A device as defined in claim 7, wherein the balanced, direct current-blocking network includes:
   first resistor and a first capacitor connected between the first connector and the one end of the first winding; and a second resistor and a second capacitor connected between the second connector and the one end of the first winding.

9. A device as defined in claim 8, wherein the indicator is connected to a junction between the first resistor and the first capacitor and to a junction between the second resistor and the second capacitor.

10. method of testing a telephone line for longitudinal balance, comprising:
- measuring an alternating current test signal applied to a telephone line under test;
- measuring stressed noise of the telephone line in response to the applied alternating current test signal;
- calculating, in response to the measured alternating current test signal and the measured stressed noise, an adjusted value related to longitudinal balance regardless of the length of the telephone line under test; and
- displaying the adjusted value;
- wherein the calculating step includes solving in a computer the equation $(x-(t-n))+y$, where $x=$a predetermined minimum acceptable longitudinal balance value, $t=$the measured value of the test signal, $n=$the measured value of stressed noise, and $y=$a predetermined value representing a maximum acceptable stressed noise level.

11. A method as defined in claim 10, wherein x is in units of dB and each of the other values is in units of dBrnC.

12. A method of testing a telephone line for longitudinal balance, comprising:
- connecting a test unit to the tip line, the ring line, and a shield of a selected telephone line to be tested;
- generating in the test unit an alternating current test signal and applying the test signal to the selected telephone line connected to the test unit;
- measuring in the test unit the alternating current test signal applied to the telephone line;
- measuring in the test unit stressed noise of the telephone line in response to the applied alternating current test signal;
- calculating in the test unit, in response to the measured alternating current test signal and the measured stressed noise, an adjusted value to indicate whether the telephone line is or is not in balance regardless of the length of the telephone line under test; and
- displaying the adjusted value;
- wherein the calculating step includes solving in a computer the equation $(x-(t-n))+y$, where $x=$a predetermined minimum acceptable longitudinal balance value, $t=$the measured value of the test signal, $n=$the measured value of stressed noise, and $y=$a predetermined value representing a maximum acceptable stressed noise level.

13. A method as defined in claim 12, wherein x is in units of dB and each of the other values is in units of dBrnC.

14. A method of testing a telephone line for longitudinal balance, comprising:
- connecting a test unit to the tip line, the ring line, and a shield of a selected telephone line to be tested;
- generating in the test unit an alternating current test signal and applying the test signal to the selected telephone line connected to the test unit;
- measuring in the test unit the alternating current test signal applied to the telephone line;
- measuring in the test unit stressed noise of the telephone line in response to the applied alternating current test signal; and
- calculating in the test unit, in response to the measured alternating current test signal and the measured stressed noise, an adjusted value to indicate whether the telephone line is or is not in balance regardless of the length of the telephone line under test;
- wherein the calculating step includes solving in a computer the equation $(x-(t-n))+y$, where $x=$a predetermined minimum acceptable longitudinal balance value, $t=$the measured value of the test signal, $n=$the measured value of stressed noise, and $y=$a predetermined value representing a maximum acceptable stressed noise level.

15. A method of testing a telephone line for longitudinal balance, comprising:
- generating an alternating current test signal including a voltage responsive to the length of a selected telephone line to be tested, and applying the test signal to the selected telephone line;
- measuring the alternating current test signal applied to the telephone line;
- measuring stressed noise of the telephone line in response to the applied alternating current test signal;
- calculating in the test unit, in response to the measured alternating current test signal and the measured stressed noise, an adjusted value to indicate whether the telephone line is or is not in balance regardless of the length of the telephone line under test; and
- displaying the adjusted value;
- wherein the calculating step includes solving in a computer the equation $(x-(t-n))+y$, where $x=$a predetermined minimum acceptable longitudinal balance value, $t=$the measured value of the test signal, $n=$the measured value of stressed noise, and $y=$a predetermined value representing a maximum acceptable stressed noise level.

16. A method as defined in claim 15, wherein x is in units of dB and each of the other values is in units of dBrnC.

17. A method of testing a telephone line for longitudinal balance, comprising:
- generating an alternating current test signal including a voltage responsive to the length of a selected telephone line to be tested, and applying the test signal to the selected telephone line;
- measuring the alternating current test signal applied to the telephone line;
- measuring stressed noise of the telephone line in response to the applied alternating current test signal; and
- calculating in the test unit, in response to the measured alternating current test signal and the measured stressed noise, an adjusted value to indicate whether the telephone line is or is not in balance regardless of the length of the telephone line under test;
- wherein the calculating step includes solving in a computer the equation $(x-(t-n))+y$, where $x=$a predetermined minimum acceptable longitudinal balance value, $t=$the measured value of the test signal, $n=$the measured value of stressed noise, and $y=$a predetermined value representing a maximum acceptable stressed noise level.

18. A longitudinal balance test circuit, comprising:
- a first connector to connect to a first wire of a telephone wire pair;
- a second connector to connect to a second wire of the telephone wire pair;
- a first winding connected from a common point to the first and second connectors; and a second winding, inductively coupled to the first winding, to connect to a voltage source providing an alternating current longitudinal test voltage.

19. A longitudinal balance test circuit as defined in claim 18, further comprising a third connector connected to the first winding, at a point different from the common point, to connect to a shield for the wire pair.

20. In a telephone technician's hand-held test circuit configured to connect an alternating current longitudinal test voltage to tip and ring lines of a telephone line to test for longitudinal balance, the improvement comprising a transformer to couple the same alternating current longitudinal test voltage concurrently to both of the tip and ring lines, wherein the transformer includes two inductively coupled windings, one of the windings connected to a source of the alternating current test voltage and to a common electrical reference and the other of the windings adapted to connect at a common point to the tip and ring lines and connected at another point to the common electrical reference.

* * * * *

UNITED STATES PATENT AND TRADEMARK OFFICE
CERTIFICATE OF CORRECTION

PATENT NO.     : 6,442,239 B1                                                Page 1 of 1
DATED          : August 27, 2002
INVENTOR(S)    : James A. Abdo, George Alter and Lawrence O. Hilligoss It is certified that error appears in the above-identified patent and that said Letters Patent is hereby corrected as shown below:

<u>Title page,</u>
Item [57], ABSTRACT,
Line 13, delete the period after "applied".

<u>Column 3,</u>
Line 35, delete "1a" and insert -- a -- therefor.
Line 45, delete "Measurement" and insert -- measurement -- therefor.

<u>Column 4,</u>
Line 9, delete the semicolon and insert -- , -- after "lines".
Line 63, delete "al" and insert -- a -- therefor.

<u>Column 5,</u>
Line 40, delete the comma after "microcomputer".
Line 42, delete the colon after "under".
Line 51, delete "bemused" and insert -- be used -- therefor.

<u>Column 7,</u>
Line 3, delete "11" and insert -- "y" -- therefor.

<u>Column 8,</u>
Lines 59-60, move these lines one indentation to the left.
Lines 61-63, move these lines one indentation to the left.

Signed and Sealed this

Twenty-fifth Day of February, 2003

JAMES E. ROGAN
*Director of the United States Patent and Trademark Office*